Patented Oct. 9, 1951

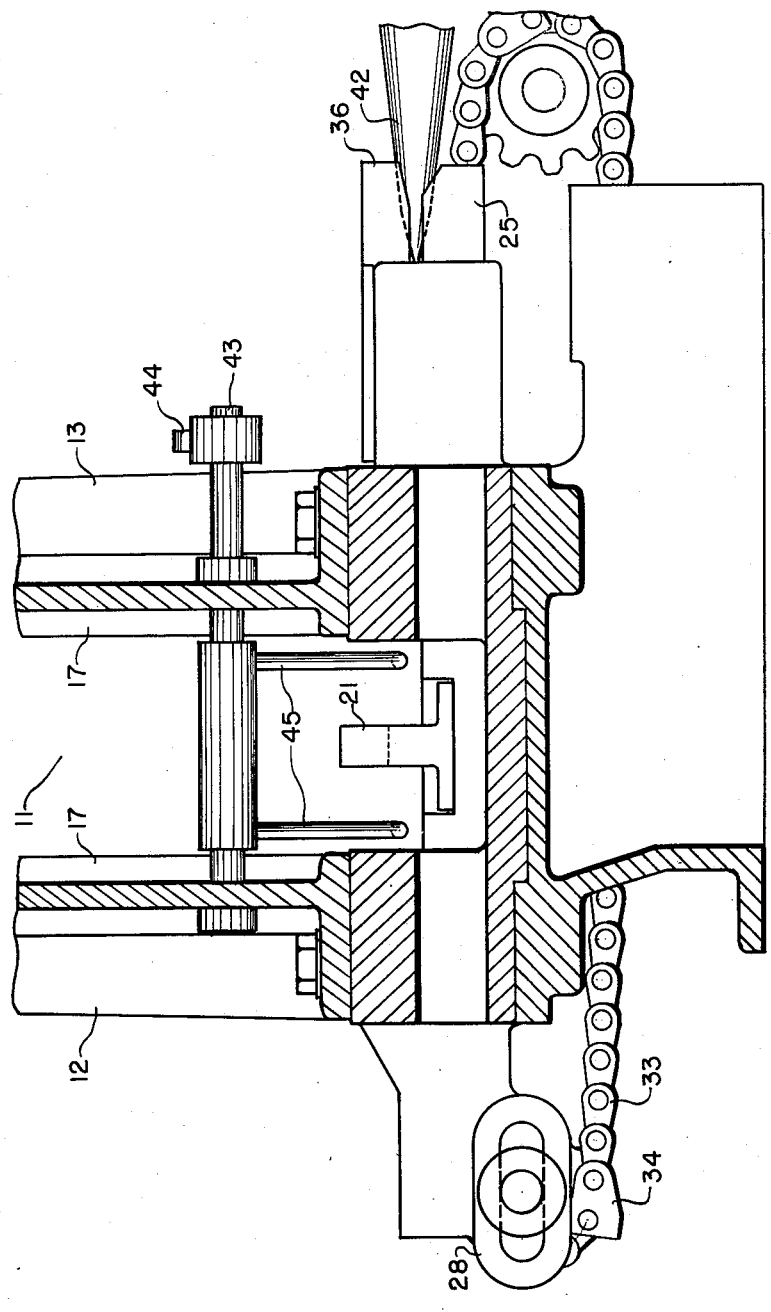

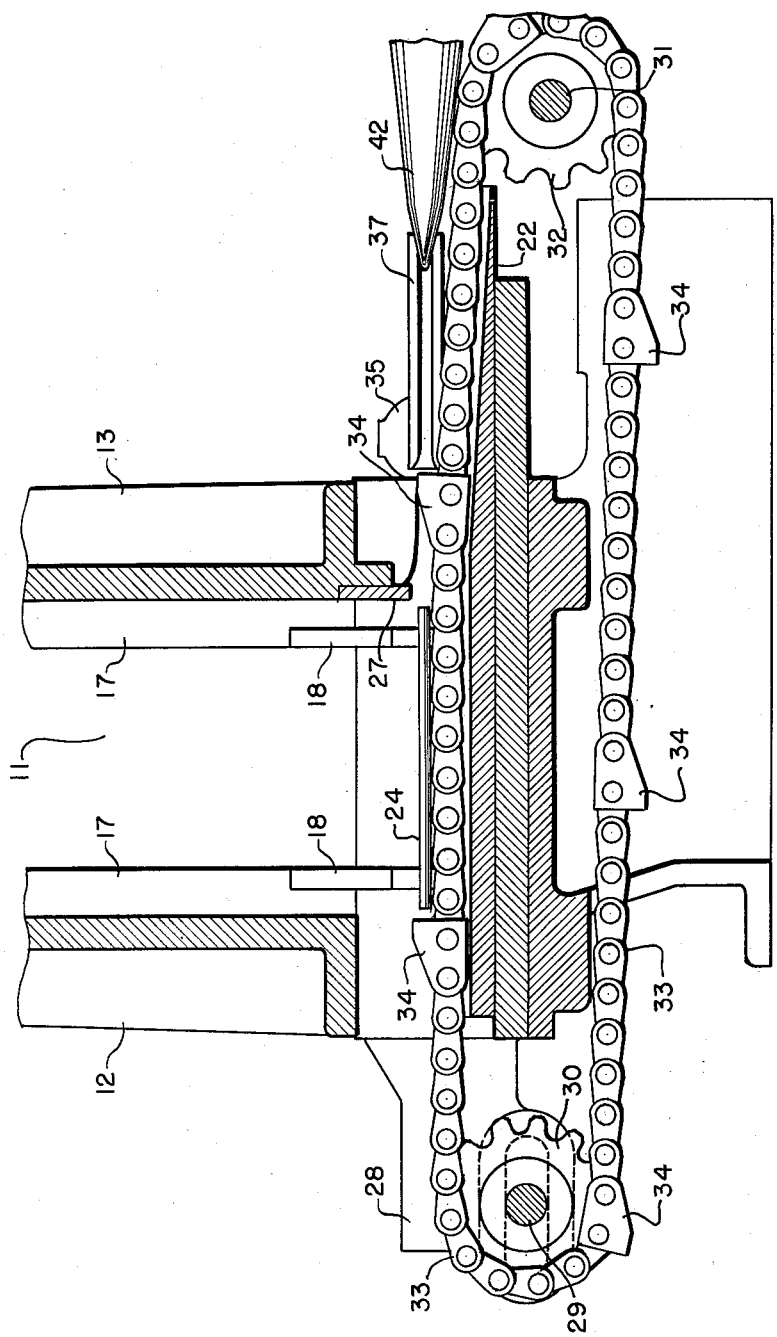

2,570,936

UNITED STATES PATENT OFFICE 2,570,936

FEEDER FOR FLATTENED CAN BODIES

William Furminger, Seattle, Wash., assignor to Continental Can Company, Inc., New York, N. Y., a corporation of New York Application December 29, 1945, Serial No. 637,885

6 Claims. (Cl. 214—8.5)

The invention to which the following description relates is a mechanism for feeding flattened can bodies one at a time from a stacked supply.

Can bodies suitable for the manufacture of cylindrical metal cans are frequently stored and transported in a flattened condition in order to save valuable shipping space. At the destination they are restored to the cylindrical form by machines of a well-known type.

Feeding the flattened can bodies to the re-forming machines has been proposed by means of spiral conveyers and the like which separate the flattened bodies one at a time from a supply. It sometimes happens that two bodies are fed together resulting in a jam of the mechanism.

In order to avoid handling two of the bodies at a time and thus cause a jam of the mechanical screw feeding device, it is an object of my invention to substitute a feeder in which only a single can can be removed at a time from the bottom of the stack.

It is a further object of my invention to support all the stack of can bodies except the lowermost, in feeding position, but out of reach of the feeding mechanism.

It is also an object of my invention to provide means which will serve to mechanically obstruct the feeding movement of all can bodies in the stack with the exception of the lowermost one.

A still further object of my invention is to provide positive means to hold the stack of cans from dropping into the reach of the feeding mechanism in case there is a stoppage or congestion in the related delivery devices.

Other objects of my invention will be apparent from the following description of the preferred form of my mechanism, as disclosed in the drawings in which Fig. 1 is a plan view partly in section of the novel feeder for flattened cans;

Fig. 3 is a longitudinal vertical section on the line 3—3 of Fig. 1 and

Fig. 4 is a similar view on the line 4—4 of Fig. 1.

Figure 1:
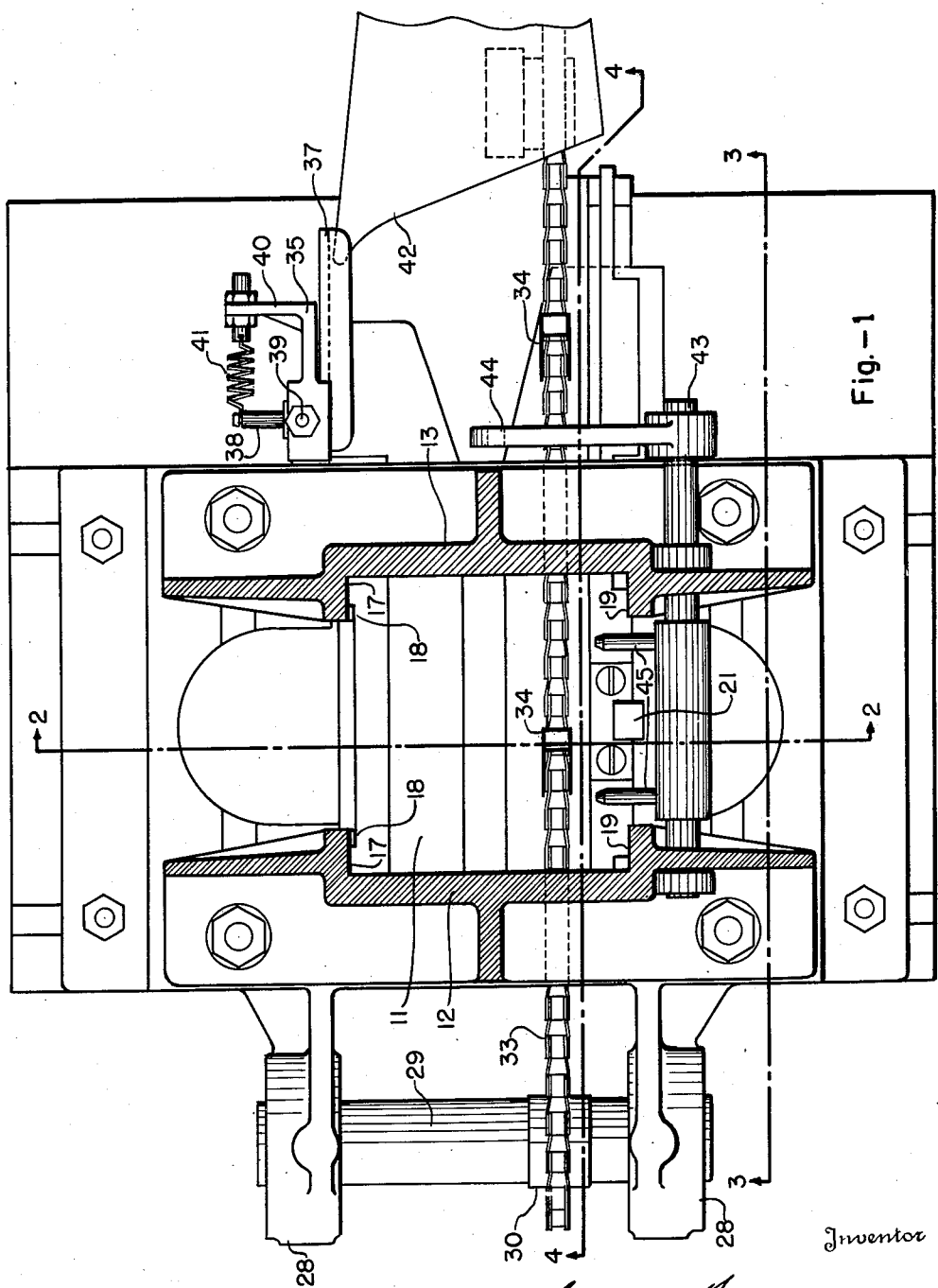

By way of illustration I have shown my feeder for flattened can bodies in the attached drawings. A hopper 11 to receive a stack of flattened can bodies, consists of a front section 12 and a separate rear section 13. The front and rear sections are both bolted as shown at 14 to base portions 15, 15. These base portions are adjustably mounted upon a foundation 16. In this way it is possible to move the base portions 15, 15 laterally of the longitudinal axis of the machine and thus accommodate hopper sections 12 and 13 of different proportions to handle can bodies of different sizes.

The sections 12 and 13 each have a side flange 17, 17 which runs vertically and receives one corner of the can body. At the base of the sections the flanges 17 each have a vertical wedge or shoulder 18 which extends inwardly and then at the bottom, tapers outwardly. This is best illustrated in Fig. 2.

The opposite ends of the sections 12 and 13 each has a vertical side flange 19 to hold the opposite corners of the flattened can bodies. This side flange 19 is channeled or recessed as at 20 (see Fig. 2) to allow for lateral movement of the bodies when passing the wedge 18.

Figure 2:
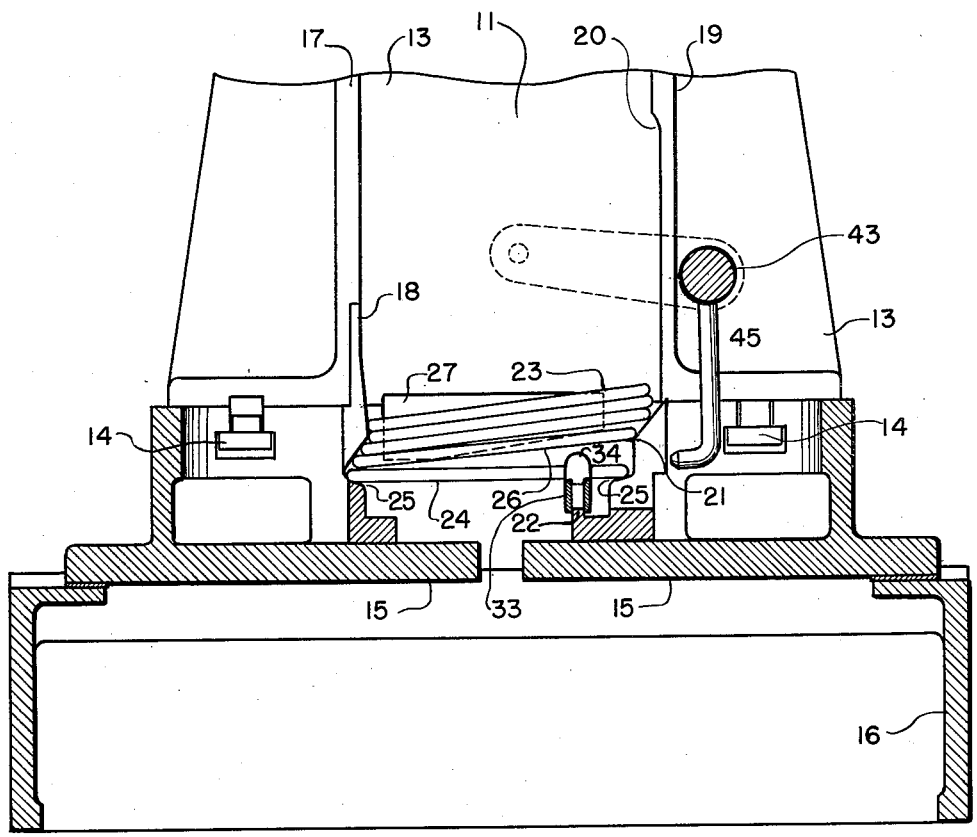
Fig. 2 is a transverse vertical section on the line 2—2 of Fig. 1.

The foundation 15 has a vertical wedge 21 (see Fig. 2). This wedge at its widest part is substantially in the same horizontal plane as the maximum projection of the shoulder or wedge 18.

Inwardly of the wedge 21 the foundation 15 has a horizontal track 22 which extends longitudinally of the machine.

Fig. 2 illustrates the principle by which a stack 23 of separate can bodies rest in flattened form. It will be noted in Fig. 2 that the lowermost can body 24 has been deflected to the right and then to the left by wedge 18 to rest upon rails 25, 25 on the base sections 15, 15 and in a horizontal position.

The next superior can body 26 has been released from the wedge 18 by reason of the latter's taper but the opposite bend edge still rests upon wedge 21. The body 26 is supported at an inclination with its lowermost edge on the can body 24.

The bodies above 26 are in positions of adjustment having been deflected by the shoulder 18 and held up by the slope of the wedge 21.

A barrier or partition 27 is mounted across the bottom edge of the rear section 13. This barrier has an upwardly sloping bottom edge conforming in general to the inclination of the body 26. In this way the barrier 27 prevents the can body 26 from being drawn out of the bottom of the hopper 11.

The forward end of the base supports a pair of brackets 28, 28 which form journals for a shaft 29. This shaft carries a fixed sprocket 30 in line with the track 22. Suitably journaled on the opposite end of the foundation is a second shaft 31 carrying a sprocket 32. An endless chain 33 is carried on the sprockets 30 and 32 and its upper flight rides upon track 22 beneath the hopper 11.

Suitably spaced along the chain 33 are dogs 34, 34. These dogs project upwardly into the plane of the can body 24 as it rests horizontally on rails 25, 25. The dogs 34, however, do not extend high enough to engage the inclined can body 26 as the latter rests upon wedge 21.

Rail 25 adjacent the chain 33 is extended beyond the base section 15 as illustrated in Fig. 3. Above the extension of rail 25 is a corresponding guide 36. This is separated from the rail 25 to provide a slot through which the folded edge of the body travels.

On the opposite side, base 15 supports a bracket 35 in the plane of the slot between rail 25 and guide 36.

A grooved track 37 is carried by a horizontal shaft 38 which, in turn, is held by a vertical pivot 39 in bracket 35 forming a universal joint. An arm 40 extends outwardly from the bracket 35 opposite the pivot 39. A coil spring 41 attached to the end of the arm 40 is anchored on shaft 38. The coil spring holds the free end of the grooved track 37 in an inward position but the track may be pressed outwardly against the influence of spring 41 by the can body 24 as it is carried past this point by the dog 34.

The groove in the track 37 receives a projecting end 42 of the customary floating horn or mandrel over which the flattened can body is forced in the operation of restoring its cylindrical form.

In order to arrest the feeding of the can bodies in the event that the operation of reforming the bodies is interrupted or there is a congestion in the discharge conveying means, I have provided a safety stop at the base of the hopper 11. A transverse rock shaft 43 is journaled between sections 12 and 13 outside of the flanges 19, 19. One end of the shaft 43 carries a rock arm 44. This rock arm may be moved by any convenient form of linkage.

Between the sections 12 and 13, the rock shaft 43 carries a pair of fingers 45, 45. The ends of these fingers normally are behind the wedge 21. However, in the event of interruption of normal operation, and by actuation of suitable linkage, the fingers are advanced to the position shown in Fig. 1. Here the fingers project inside the wedge 21 and form an additional rest for the inclined can body 26. The fingers 45, 45 support the nearer end of the can body regardless of the fact that the farther end may come to rest upon the adjacent rail 25. As a consequence the dog 34 travels through the hopper without engaging can body 26 and the delivery of can bodies to the re-forming horn 42 is suspended until such time as rock shaft 43 withdraws fingers 45, 45 from their supporting position. As soon as fingers 45, 45 are withdrawn, the nearer end of the can body 26 drops into the position indicated in Fig. 2 for the can body 24 and the next succeeding dog 34 advances that can body to the re-forming machine.

The operation of this machine will, of course, be readily understood. The operator fills the hopper 11 with the folded can bodies and gravity will cause the lower bodies to follow the successive positions indicated in Fig. 2. As a dog 34 of the conveyer removes the lowermost body 24, another body 26 is dropped into position for removal.

Each can body is forced into the throat of the grooved track 37 and over the projecting point 42 of the re-forming horn. In this operation the grooved track 37 yields against the force of the spring 41. As the re-forming horn is mounted to "float" and its position may vary, the end of the track 37 will follow due to its universal mounting. This means for centering the can bodies for engagement on the point 42 as described here, is disclosed and claimed in the application of Oswald Thanem for patent filed February 27, 1946, Serial No. 650,686 and now Patent No. 2,455,827 granted December 7, 1948.

The feeding of the flattened can bodies proceeds by gravity, each successive can being separated from the following ones and individually dropped into position for feeding. At the same time the remaining can bodies cannot drop into feeding position until the previous bodies have been advanced.

Interruption of normal operation and the actuation of the fingers 45 suspends delivery of the bodies from the hopper 11.

While I have shown the preferred form of my machine, the scope of the invention is not limited to this form but comprises changes in proportions, arrangement of details and other minor features within the scope of the following claims.

What I claim is:

1. A machine for feeding flattened can bodies, comprising a chute for holding a vertical stack of horizontally arranged flattened can bodies, a recessed chute wall, an inwardly sloping wedge beneath the recessed wall, the opposite chute wall having a shoulder sloping outwardly and downwardly from the horizontal plane of the base of said wedge, rails spaced beneath the level of said shoulder for holding the lowermost can body horizontally, said can body supporting the immediately superior bodies in inclined position each with an edge against the shoulder and an opposite edge on the wedge, and a movable conveyer for conveying said lowermost body from beneath the stack in a direction at right angles to the vertical plane in which the can bodies are tilted.

2. A machine for feeding flattened can bodies comprising a chute for holding a vertical stack of horizontally arranged flattened can bodies, a recessed chute wall, an inwardly sloping wedge beneath the recessed wall, the opposite chute wall having a shoulder sloping inwardly opposite the recess in the first mentioned wall and then sloping outwardly and downwardly from the horizontal plane of the base of the said wedge, rails spaced beneath the level of the said shoulder, for holding the lowermost can body horizontally, said can body supporting the immediately superior bodies in inclined position each with an edge against the shoulder and an opposite edge on the wedge, a depending barrier on an intermediate chute wall opposite the said superior bodies, and a movable conveyer for conveying said lowermost body laterally beneath the said barrier.

3. A machine for feeding flattened can bodies comprising a chute for holding a vertical stack of horizontally arranged flattened can bodies, a recessed chute wall, an inwardly projecting shoulder on the opposite chute wall, opposite the recess, an inwardly sloping wedge beneath the recessed wall and opposite the shoulder, rails spaced beneath the shoulder and wedge for holding the lowermost can body horizontally, said can body supporting the immediately superior bodies in inclined position each with an edge against the shoulder and an opposite edge on the wedge, and a movable conveyer for conveying said lowermost body from beneath the stack in a direction at right angles to the vertical plane in which the can bodies are tilted.

4. A machine for feeding flattened can bodies, comprising a chute for holding a vertical stack of horizontally arranged flattened can bodies, tilting means for a group of can bodies at the base of the chute, separating means for separating the lowermost can body from the tilted group, a pair of horizontal rails for supporting the lowermost can body horizontally in spaced position below the tilting means, a barrier depending from a chute wall at a right angle to the tilting means opposite the tilted bodies and having a lower edge inclined approximately parallel to the tilted bodies, a conveyer passing transversely of the chute beneath the barrier, and means on the conveyer for engaging the lowermost body opposite the higher end of the inclined edge of the barrier.

5. A machine for feeding flattened can bodies, comprising a chute for holding a vertical stack of horizontally arranged flattened can bodies, a wedge and a shoulder on opposite sides of the chute for tilting a group of can bodies at the base of the chute, means for receiving and supporting the lowermost can body horizontally in spaced relation below the wedge, a conveyer running across the chute in a direction at right angles to the vertical plane in which the bodies are tilted for conveying said lowermost can body from beneath said chute, and body engaging means on the conveyer adjacent the wedge but below the wedge supported bodies.

6. A machine for feeding flattened can bodies, comprising a chute for holding a vertical stack of horizontally arranged flattened can bodies, a wedge and a shoulder on opposite sides of the chute for tilting a group of can bodies at the base of the chute, means for conveying the lowermost body from beneath said chute in a direction at right angles to the vertical plane in which the can bodies are tilted, and a finger horizontally shiftable into the path of the can bodies as they move over the wedge to support the tilted group independently at that point.

WILLIAM FURMINGER.

REFERENCES CITED

The following references are of record in the file of this patent:

UNITED STATES PATENTS

| Number | Name | Date |
| --- | --- | --- |
| 931,003 | Warme | Aug. 10, 1909 |
| 2,138,662 | Neumair | Nov. 29, 1938 |
| 2,297,847 | Wilckens et al. | Oct. 6, 1942 |
| 2,345,937 | Joa | Apr. 4, 1944 |

FOREIGN PATENTS

| Number | Country | Date |
| --- | --- | --- |
| 503,739 | Great Britain | Apr. 13, 1939 |